O. A. MYGATT.

GLASS REFLECTOR SHADE.

APPLICATION FILED MAY 15, 1907.

Reissued July 22, 1913.

13,600.

2 SHEETS—SHEET 1.

WITNESSES

Chas. H. Davies.

Margaret Smith.

INVENTOR

Otis A. Mygatt by Bartlett & Brock

Attorneys

O. A. MYGATT.

GLASS REFLECTOR SHADE.

APPLICATION FILED MAY 15, 1907.

Reissued July 22, 1913.

13,600.

2 SHEETS—SHEET 2.

WITNESSES

Chas. K. Davies.

Margaret Smith.

INVENTOR

Otis A. Mygatt by Bartlett & Brock

Attorneys

UNITED STATES PATENT OFFICE.

OTIS A. MYGATT, OF NEW YORK, N. Y.

GLASS REFLECTOR-SHADE.

13,600. Specification of Reissued Letters Patent. Reissued July 22, 1913.

Original No. 804,254, dated November 14, 1905, Serial No. 210,978. Application for reissue filed May 15, 1907. Serial No. 373,882.

*To all whom it may concern:*

Be it known that I, OTIS A. MYGATT, a citizen of the United States, residing at New York, State of New York, have invented certain new and useful Improvements in Glass Reflector-Shades, of which the following is a specification.

This invention relates to improvements in glass reflector-shades.

The object of the invention is to produce in one unitary structure a reflector and shade having a part acting as a reflector and an opposite part acting as a light-directing, distributing or softening shade.

The invention consists in a structure having a part, usually about one-half its surface, covered with a specular surface, such as reflecting-prisms, constructed to reflect back into the shade a large portion of the light-rays which emanate within the reflector. The other side of the reflector-shade has on its outer surface a series of light-directing or distributing surfaces, such as prisms or ribs, which prisms direct the light in any desirable direction and at the same time soften the light-rays. On this directing side the interior surface of the shade may also be covered with diffusing-ribs, which soften the light-rays before they reach the final light-reflecting surfaces.

Figure 1:
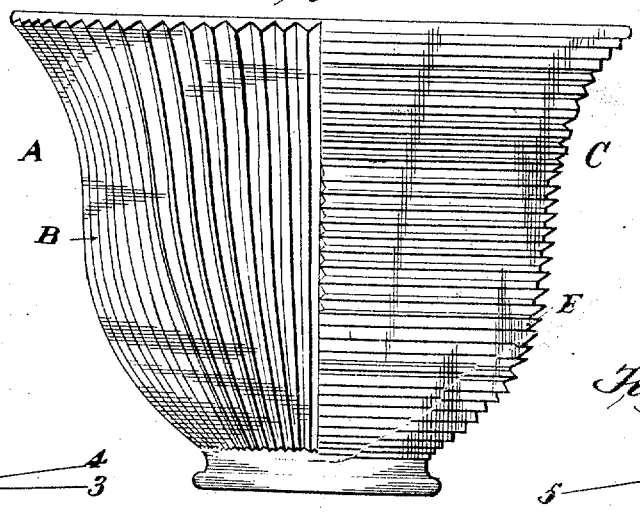
Figure 2:
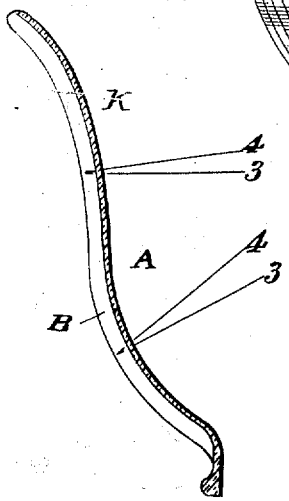
Figure 3:
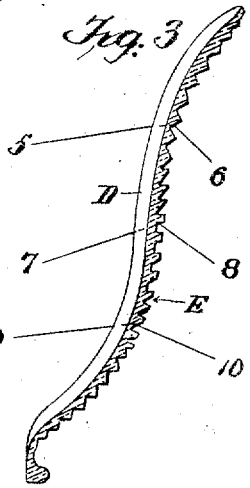
Figure 4:
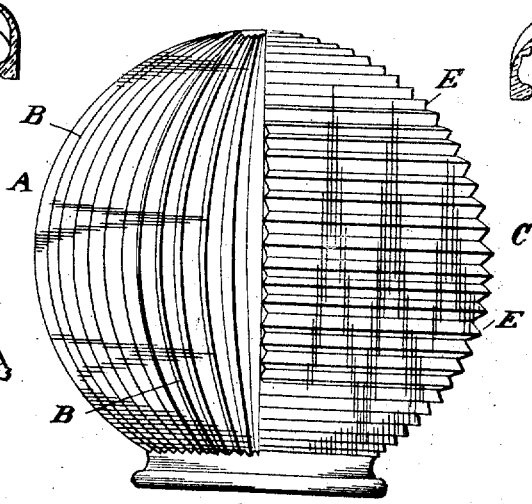
Figure 5:
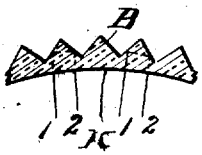
Figure 6:
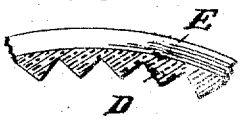
Figure 7:
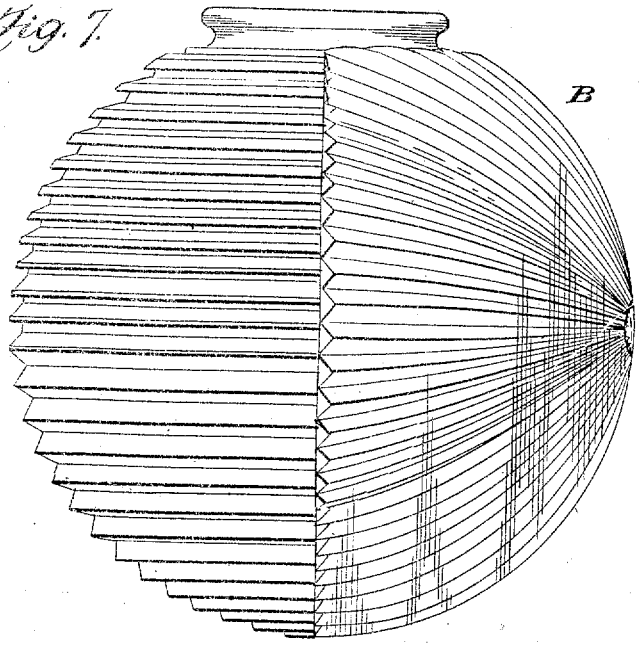
Figure 9:
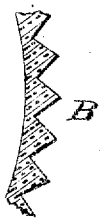
Figure 8:
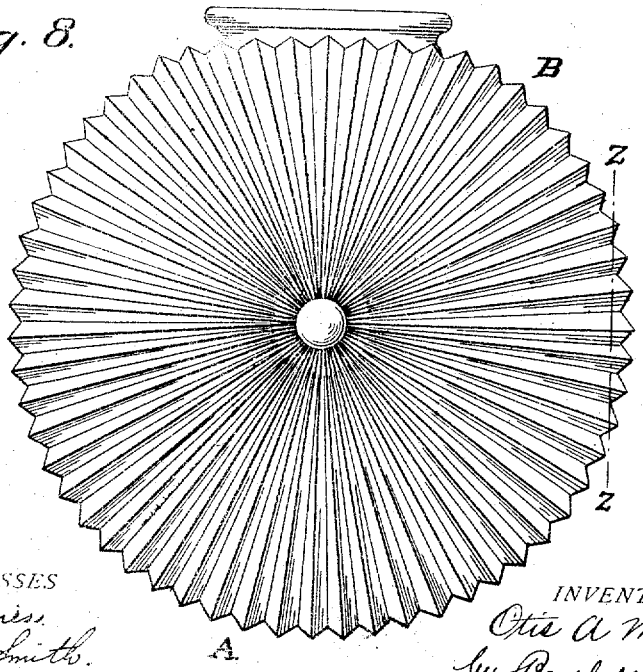

Figure 1 is a side elevation of a shade-reflector embodying the principles of the present invention; Fig. 2 is a vertical section of the rear side of said device; Fig. 3 is a vertical section of the front side thereof; Fig. 4 is a broken horizontal section at the rear side of the shade-reflector; and Fig. 5 is a broken horizontal section at the front side of the shade-reflector in any plane in which the prisms appear. Fig. 6 is a side elevation of a modified form of shade-reflector; Fig. 7 is a side elevation of a further modification; Fig. 8 is a rear elevation of Fig. 7; Fig. 9 a broken section on line *z—z*.

My shade-reflectors are made of pressed glass and in all common sizes are in a single piece. That side A of the body of the structure which is to act as a specular reflector may be substantially covered by external prisms B. These prisms are of the character termed by me "double-reflecting" prisms—that is, the light from within the reflector encounters a smooth interior surface K and is deflected very little or not at all thereby. Passing to the outer inclined face of a prism B a light-ray encounters this face at an angle of forty-five degrees, (for best results). The ray is reflected at a right angle directly across the prism and strikes the second inclined face also at an angle of forty-five degrees thereto, (see Fig. 4,) wherein 1 2 indicates a light-ray thus reflected twice. The light-ray is thus returned on a line substantially parallel with its line of radiation. This direction of a light-ray may be somewhat modified by the form of the body, as at 3 4, Fig. 2. For ordinary consideration it may be calculated that from seventy to eighty per cent. of the light will be thrown back toward and through a lamp inclosed in the reflector and toward the shade or light distributing or radiating side of the device.

The shade-reflectors are shown in vertical position in Figs. 1 and 6, but can be turned to any position desired. For convenience of description the specular reflecting surfaces which are here illustrated in the form of prisms will be described in the positions they occupy when the reflector-shades are in the position of Figs. 1 and 6. Thus it will be seen that the prisms B extend in generally vertical direction with reference to the body of the shade-reflector. In a spherical reflector the reflecting-prisms are substantially in the form of lunes. Some light will pass through the prismatic reflector, and the external appearance of a lighted reflector will be that of a darkened surface with bright lines thereof. To maintain the proper reflective angles of their plane surfaces, the reflecting-prisms must vary in width and height with their position on the body of the reflector.

The front or light-diffusing side C of the shade-reflector is preferably covered internally with small vertical or lunar prisms or ribs D. These internal prisms will not reflect the light back toward its source, but will simply deflect the light-rays more or less in horizontal directions as they pass through the glass. The surfaces need not be planes, but may be merely rounded flutings for this purpose. The amount of light received by the front face C or shade part of the device will be something less than twice the amount which would be there received were the reflector part of the device omitted.

The outer surface of the shade C is substantially covered with light-directing surfaces, preferably horizontal directing or distributing surfaces, such as prisms E. These prisms are of various characters, according to the illuminations desired. These prisms may be single-reflecting prisms or light-directing prisms and do not reflect light to any considerable extent back into the interior of the shade-reflector, but direct the rays in calculated directions or in all directions.

The upper prisms—say for one-fourth the height of the shade—may be made to direct the light-rays in a direction inclined downwardly at a considerable angle. The prism along the central part of the face C may be made to direct the rays downwardly at a lesser angle, and the prisms at the lower part of the face C may be made to direct the rays about horizontally. Such directions for light-rays are indicated by lines 5 6, 7 8, 9 10, Fig. 3. Such an arrangement for prisms will give a concentration of light along a horizontal band near the shade-face. Other arrangement of construction of the prisms E may be made to concentrate the rays or to diffuse them, as desired. The directing-planes of these prisms are determined by the mold, which is made on carefully-calculated lines.

By continuing the reflector side of the device for something more than half the circumference a very considerable concentration of light-rays may be effected over a limited area at the front of the reflector-shade.

In my Patent No. 736,535, of August 18, 1903, the construction of vertical reflecting-prisms on the outer face of the reflector is explained. These latter prisms I term "double-reflecting" prisms, while the horizontal prisms E, if reflectors at all, are single-reflecting or light-distributing prisms and may serve merely to diffuse the light-rays.

By "light-distributing" prisms I refer to prisms having their plane faces at calculated angles with reference to the source of light, so that a large proportion of light passing through the prisms collectively shall be by the prisms directed in definite quantities in predetermined directions. By "light-diffusing" I mean the breaking up of the light-rays and the scattering and softening of the rays without attempt to control the quantity of light in a given direction.

As shown in Figs. 7 and 8, the reflector may have lunar reflecting-prisms radiating from one center instead of from two centers, as in Fig. 6.

Light-distribution, as understood in this species of the art, is the direction of light-rays in definite and determined directions. Light-diffusion is the softening or blending of light-rays, with no special relation to their ultimate direction.

In my Patent No. 736,535 a shade is described wherein the upper part of the globe is a reflector and the lower part is surrounded by circumferential prisms, which may be directing-prisms. If this globe were turned at a right-angle, it would have the effect of directing the light in rings or circles instead of the transverse distribution of the light-rays in a plane or planes, as in the present invention.

The reflector-shade has a portion A which reflects light interiorly across the reflector-shade. It has also a transmitting portion C, transversely-distributive of light, which transmits the light reflected across the device out through the plane transverse diffusing or directing-portion.

Of the specular reflecting surfaces, probably the best results are secured by using double-reflecting prisms of about 90°. By "specular" reflecting portions are meant surfaces having approximately-total reflecting properties. The double-reflecting prisms herein described are examples of such specular surfaces.

I claim:

1. A reflector-shade for the asymmetric distribution of light in straight parallel planes, comprising an integral glass inclosure having upon one side a reflector-portion and upon the other side a series of asymmetric light distributing ribs lying in parallel planes transversely crossing substantially at right angles the body of the reflector opposite the reflector-portion.

2. A reflector-shade for the asymmetric distribution of light in straight parallel planes, comprising an integral glass inclosure having upon one side a prismatic reflector-portion and upon the other side a series of asymmetric light distributing ribs lying in parallel planes transversely crossing substantially at right angles the body of the reflector opposite the reflector-portion.

In testimony whereof I affix my signature in the presence of two subscribing witnesses.

OTIS A. MYGATT.

Witnesses:
ROBERT KELLY, JR.,
ERNEST P. ROY.